US011873781B1

(12) United States Patent
Winkler et al.

(10) Patent No.: US 11,873,781 B1
(45) Date of Patent: Jan. 16, 2024

(54) THRUST REVERSER CASCADE WITH ONE OR MORE FLOW STABILIZERS

(71) Applicant: Rohr, Inc., Chula Vista, CA (US)

(72) Inventors: Julian Winkler, Glastonbury, CT (US); Wentaur E. Chien, San Diego, CA (US); Xiaolan Hu, San Diego, CA (US); Landy Dong, La Jolla, CA (US)

(73) Assignee: ROHR, INC., Chula Vista, CA (US)

( * ) Notice: Subject to any disclaimer, the term of this patent is extended or adjusted under 35 U.S.C. 154(b) by 0 days.

(21) Appl. No.: 17/878,497

(22) Filed: Aug. 1, 2022

(51) Int. Cl.
| | |
|---|---|
| *F02K 1/72* | (2006.01) |
| *F02K 1/62* | (2006.01) |
| *F02K 1/32* | (2006.01) |
| *F02K 1/54* | (2006.01) |
| *F02K 1/56* | (2006.01) |
| *F02K 1/60* | (2006.01) |
| *F02K 1/76* | (2006.01) |
| *F02K 1/50* | (2006.01) |
| *F02K 1/64* | (2006.01) |
| *F02K 1/70* | (2006.01) |

(52) U.S. Cl.
CPC ............. *F02K 1/72* (2013.01); *F02K 1/32* (2013.01); *F02K 1/50* (2013.01); *F02K 1/54* (2013.01); *F02K 1/56* (2013.01); *F02K 1/60* (2013.01); *F02K 1/625* (2013.01); *F02K 1/64* (2013.01); *F02K 1/70* (2013.01); *F02K 1/76* (2013.01); *F05D 2220/323* (2013.01); *F05D 2240/129* (2013.01)

(58) Field of Classification Search
CPC ..... F02K 1/32; F02K 1/54; F02K 1/60; F02K 1/625; F02K 1/70; F02K 1/72; F02K 1/50; F02K 1/56; F02K 1/64; F02K 1/68; F02K 1/76
See application file for complete search history.

(56) References Cited

U.S. PATENT DOCUMENTS

| | | | |
|---|---|---|---|
| 3,721,314 A | 3/1973 | Hoch | |
| 4,030,290 A * | 6/1977 | Stachowiak | .............. F02K 1/64 |
| | | | 239/265.33 |
| 4,671,460 A | 6/1987 | Kennedy | |
| 4,894,985 A | 1/1990 | Dubois | |
| 5,347,808 A | 9/1994 | Standish | |
| 6,029,439 A | 2/2000 | Gonidec | |

(Continued)

FOREIGN PATENT DOCUMENTS

| | | |
|---|---|---|
| WO | 2020224886 A1 | 11/2020 |
| WO | 2020224888 A1 | 11/2020 |
| WO | 2020224889 A1 | 11/2020 |

*Primary Examiner* — Kyle Robert Thomas
(74) *Attorney, Agent, or Firm* — Getz Balich LLC

(57) ABSTRACT

An apparatus is provided for an aircraft propulsion system. This apparatus includes a thrust reverser cascade extending longitudinally between a cascade forward end and a cascade aft end. The thrust reverser cascade extends laterally between a cascade first side and a cascade second side. The thrust reverser cascade extends radially between a cascade inner face and a cascade outer face. The thrust reverser cascade includes a plurality of vanes and a wall. The vanes are arranged in a longitudinally extending array along the cascade inner face. The vanes include a first vane and a second vane. The wall is configured to block gas flow radially through the thrust reverser cascade between the first vane and the second vane.

19 Claims, 14 Drawing Sheets

(56) References Cited

U.S. PATENT DOCUMENTS

| | | | |
|---|---|---|---|
| 6,151,883 A | 11/2000 | Hatrick | |
| 6,402,092 B1 | 6/2002 | Jean | |
| 8,484,944 B2 * | 7/2013 | Urban | F02K 1/72 |
| | | | 244/110 B |
| 9,068,532 B2 | 6/2015 | Gormley | |
| 9,086,034 B2 * | 7/2015 | Aten | F02K 1/72 |
| 9,371,799 B2 | 6/2016 | Packard | |
| 9,719,466 B2 | 8/2017 | Nakhjavani | |
| 9,915,226 B2 | 3/2018 | Gormley | |
| 10,184,426 B2 | 1/2019 | Schrell | |
| 10,337,454 B2 | 7/2019 | Smith | |
| 10,556,672 B2 | 2/2020 | Paolini | |
| 10,590,885 B2 | 3/2020 | Acheson | |
| 10,794,328 B2 | 10/2020 | Gormley | |
| 10,837,404 B2 | 11/2020 | Aziz | |
| 11,053,887 B2 | 7/2021 | Gormley | |
| 2012/0036716 A1 * | 2/2012 | Urban | F02K 1/72 |
| | | | 29/889 |
| 2016/0243806 A1 | 8/2016 | Frost | |
| 2016/0341150 A1 | 11/2016 | Chuck | |
| 2017/0058828 A1 * | 3/2017 | Dong | F02K 1/625 |
| 2017/0335771 A1 | 11/2017 | Post | |
| 2020/0003152 A1 | 1/2020 | Gormley | |

\* cited by examiner

THRUST REVERSER CASCADE WITH ONE OR MORE FLOW STABILIZERS

BACKGROUND

1. Technical Field

This disclosure relates generally to an aircraft propulsion system and, more particularly, to a thrust reverser for the aircraft propulsion system.

2. Background Information

An aircraft propulsion system with a turbofan or turbojet gas turbine engine may be configured with a thrust reverser system. The thrust reverser system is configured to redirect gas flowing within the aircraft propulsion system outward of the aircraft propulsion system and generally forward to produce reverse thrust. Various types and configurations of thrust reverser systems are known in the art. While these known thrust reverser systems have various benefits, there is still room in the art for improvement.

SUMMARY OF THE DISCLOSURE

According to an aspect of the present disclosure, an apparatus is provided for an aircraft propulsion system. This apparatus includes a thrust reverser cascade extending longitudinally between a cascade forward end and a cascade aft end. The thrust reverser cascade extends laterally between a cascade first side and a cascade second side. The thrust reverser cascade extends radially between a cascade inner face and a cascade outer face. The thrust reverser cascade includes a plurality of vanes and a wall. The vanes are arranged in a longitudinally extending array along the cascade inner face. The vanes include a first vane and a second vane. The wall is configured to block gas flow radially through the thrust reverser cascade between the first vane and the second vane.

According to another aspect of the present disclosure, another apparatus is provided for an aircraft propulsion system. This apparatus includes a thrust reverser cascade extending longitudinally between a cascade forward end and a cascade aft end. The thrust reverser cascade extends laterally between a cascade first side and a cascade second side. The thrust reverser cascade extends radially between a cascade inner face and a cascade outer face. The thrust reverser cascade includes a plurality of vanes and a wall. The vanes are distributed longitudinally along the cascade inner face. The vanes include a first vane and a second vane longitudinally aft of the first vane. The wall is longitudinally between and connected to the first vane and the second vane.

According to still another aspect of the present disclosure, another apparatus is provided for an aircraft propulsion system. This apparatus includes a thrust reverser cascade extending longitudinally between a cascade forward end and a cascade aft end. The thrust reverser cascade extends laterally between a cascade first side and a cascade second side. The thrust reverser cascade extends radially between a cascade inner face and a cascade outer face. The thrust reverser cascade includes a plurality of channels arranged in a longitudinally extending array. Each of the channels extends radially through the thrust reverser cascade from the cascade inner face to the cascade outer face. The channels include a first channel, a second channel and a third channel. The second channel is longitudinally between and neighbors the first channel and the third channel. A longitudinal distance between the first channel and the second channel different than a longitudinal distance between the second channel and the third channel.

The thrust reverser cascade may also include a first rail and a second rail. The vanes may extend laterally between and may be connected to the first rail and the second rail. The wall may extend laterally between and may be connected to the first rail and the second rail.

The wall may be disposed at the cascade inner face.

The wall may extend longitudinally between and may be connected to the first vane and the second vane.

The thrust reverser cascade may also include a plurality of rails extending longitudinally along and connected to the vanes. The wall may extend laterally between and may be connected to the rails.

The wall may be configured as or otherwise include a first panel connected to: the first vane at a leading edge of the first vane; and the second vane at a leading edge of the second vane.

The wall may be configured as or otherwise include a second panel connected to: the first vane at a trailing edge of the first vane; and the second vane at a trailing edge of the second vane.

A cavity may extend longitudinally within the thrust reverser cascade between the first vane and the second vane. The cavity may extend radially within the thrust reverser cascade between the first panel and the second panel.

The cavity may be empty.

The cavity may be at least partially (e.g., partially or completely) filled with filler material.

A groove may project radially into the thrust reverser cascade from the cascade outer face to the first panel. The groove may extend longitudinally within the thrust reverser cascade between the first vane and the second vane.

The wall may extend longitudinally between the first vane and the second vane. The wall may extend radially between the cascade inner face and the cascade outer face.

The vanes may also include a third vane. A first channel may extend radially through the thrust reverser cascade between the third vane and the first vane.

The third vane may be longitudinally forward of the first vane.

The third vane may be longitudinally aft of the first vane.

The vanes may also include a fourth vane. A second channel may extend radially through the thrust reverser cascade between the fourth vane and the second vane.

The apparatus may also include a pivoting door thrust reverser system that includes the thrust reverser cascade.

The apparatus may also include a propulsion system structure that includes a flowpath and a thrust reverser system. The flowpath may extend within the propulsion system structure to an exhaust nozzle. The thrust reverser system may include the thrust reverser cascade. The thrust reverser cascade may be exposed to the flowpath when the thrust reverser system is stowed.

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

Figure 1:
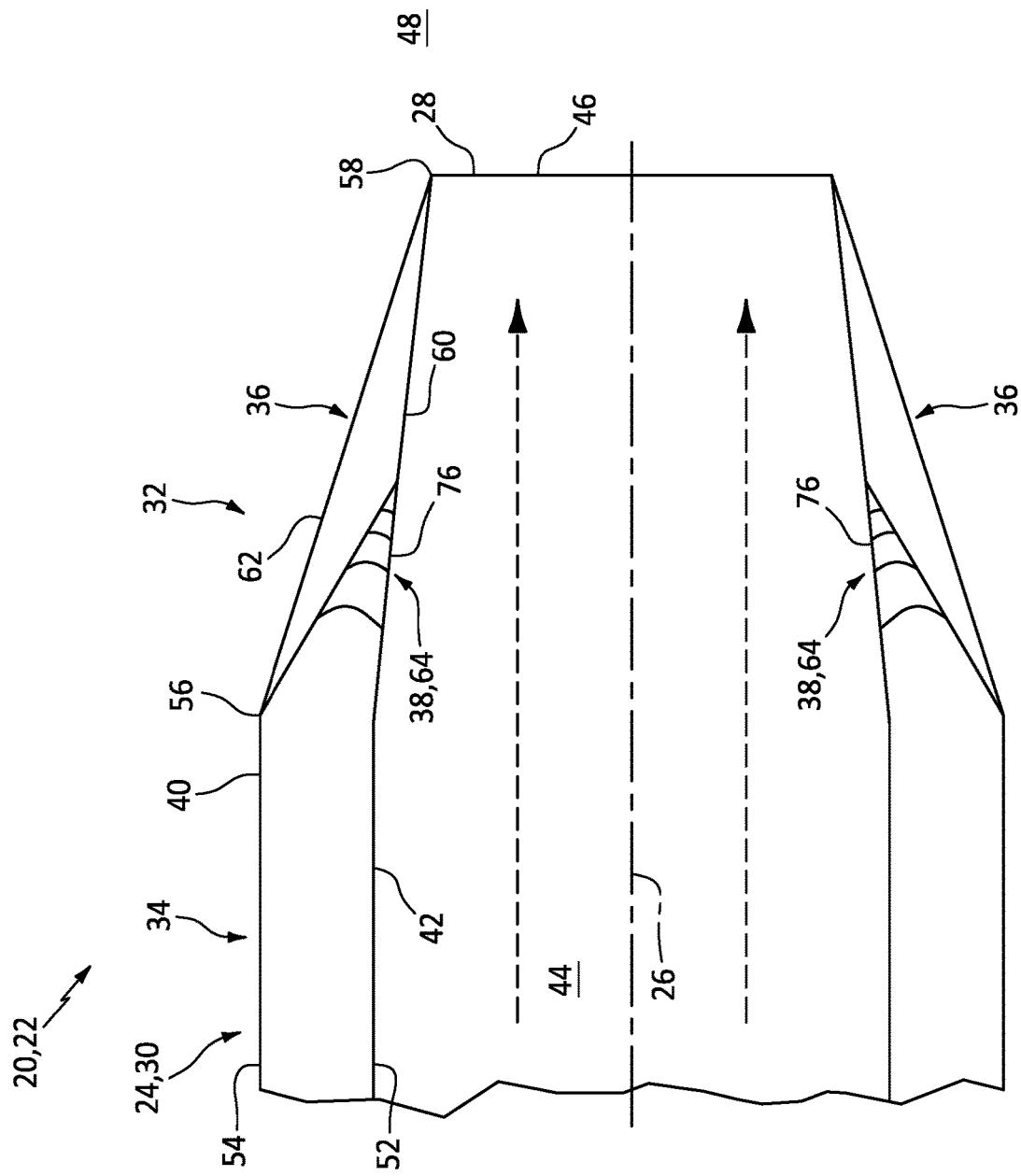
FIG. 1 is a side sectional schematic illustration of an aft section of an aircraft propulsion system with its thrust reverser doors stowed.
Figure 2:
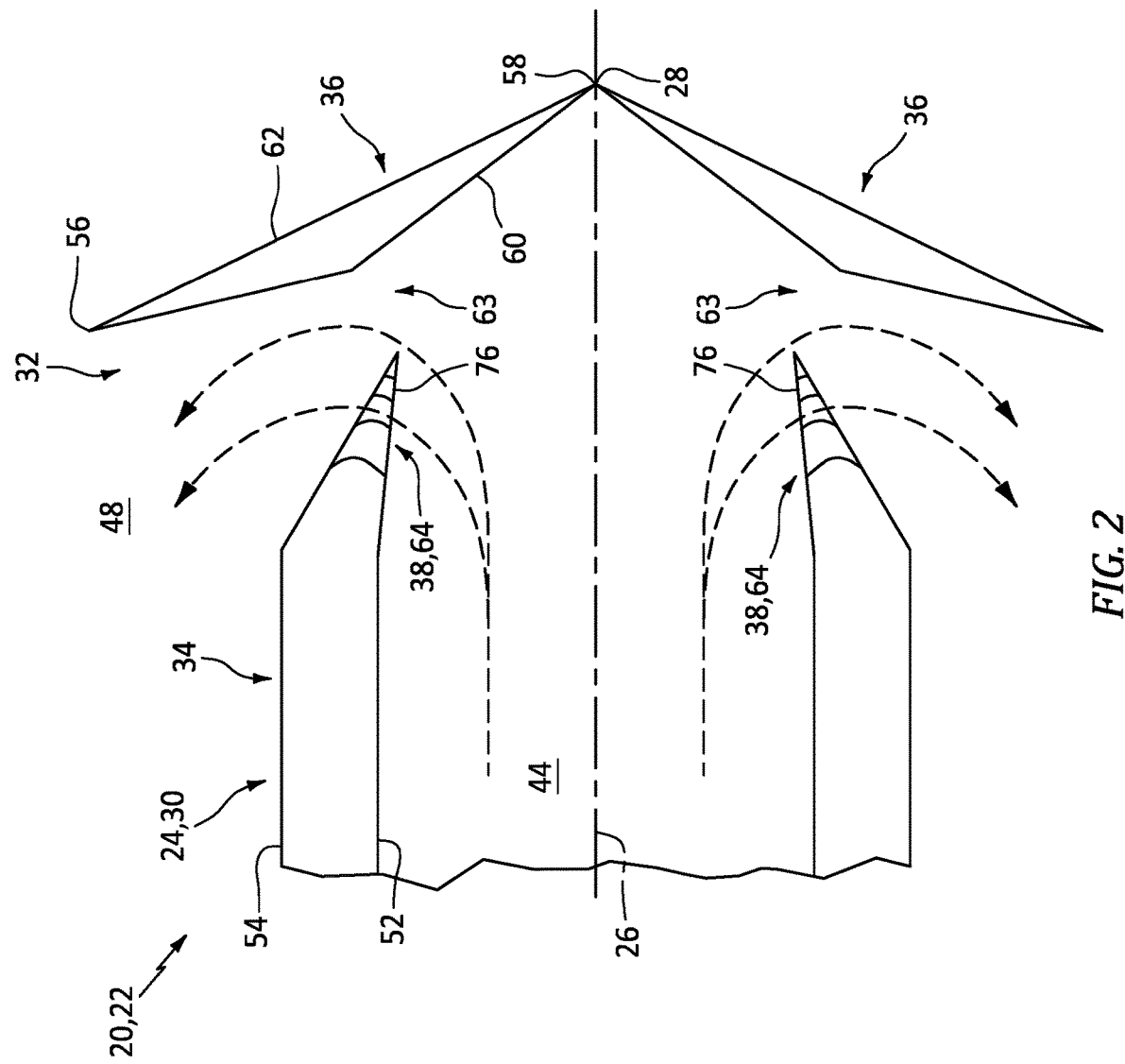
FIG. 2 is a side sectional schematic illustration of the aft section of the aircraft propulsion system of FIG. 1 with its thrust reverser doors deployed.

FIGS. 1 and 2 illustrate an aft section 20 of a propulsion system 22 for an aircraft such as, but not limited to, a commercial airliner or cargo plane. This aircraft propulsion system 22 includes a nacelle 24 and a gas turbine engine (not visible in FIGS. 1 and 2). The gas turbine engine may be configured as a turbojet gas turbine engine or a turbofan gas turbine engine; however, the present disclosure is not limited to such exemplary engine configurations.

The nacelle 24 is configured to house and provide an aerodynamic cover for the gas turbine engine. The nacelle 24 extends axially along an axial centerline 26 of the aircraft propulsion system 22 to a downstream, aft end 28 of the nacelle 24. The nacelle 24 of FIGS. 1 and 2 includes a nacelle aft structure 30 (a structure of the aircraft propulsion system 22) configured with a thrust reverser system 32. This thrust reverser system 32 is configured as a pivoting door thrust reverser system. More particularly, the thrust reverser system 32 may be configured as a target-type thrust reverser system. The term "target-type" may describe a pivoting door thrust reverser system that redirects a hot gas stream (e.g., a core gas stream) exhausted from the gas turbine engine, or both an outer cold gas stream (e.g., a bypass gas stream) and an inner hot gas stream (e.g., a core gas stream) exhausted from the gas turbine engine. It is contemplated, however, the thrust reverser system 32 may alternatively be configured as a clamshell-type thrust reverser system. The term "clamshell-type" may describe a pivoting door thrust reverser system that redirects an outer cold gas stream exhausted from the gas turbine engine, but not an inner hot gas stream exhausted from the gas turbine engine.

The aft structure 30 of FIGS. 1 and 2 includes a fixed structure 34, one or more (e.g., an opposing pair of) thrust reverser doors 36 and one or more cascade structures 38. Referring to FIG. 1, the aft structure 30 and its components (e.g., 34 and 36) are configured to form an aft portion of an outer aerodynamic flow surface 40 of the nacelle 24. The aft structure 30 and its components (e.g., 34, 36 and 38) are configured to form an aft portion of an inner aerodynamic flow surface 42 of the nacelle 24. This aft portion of the inner aerodynamic flow surface 42 forms an outer peripheral boundary of an aft-most portion of a flowpath 44 within the aircraft propulsion system 22. This aft-most portion of the flowpath 44 receives a gas flow (e.g., core gas and/or bypass air) from the upstream gas turbine engine. The aft-most portion of the flowpath 44 extends axially along the axial centerline 26 within the aircraft propulsion system 22 and its aft structure 30 to an annular trailing edge of an exhaust nozzle 46, at which point the flowpath 44 of FIG. 1 meets an exterior environment 48 surrounding the aircraft propulsion system 22. This exhaust nozzle 46 may be at least partially or completely formed by the thrust reverser doors 36 as shown in FIG. 1. Alternatively, referring to FIGS. 3 and 4, an aft portion 50 of the fixed structure 34 (or another standalone nozzle structure) may at least partially or completely form the exhaust nozzle 46. With such an arrangement, the thrust reverser system 32 may be termed a "pre-exit" thrust reverser system.

The fixed structure 34 of FIG. 1 extends axially along the axial centerline 26 to a downstream, aft end of the fixed structure 34. The fixed structure 34 extends radially between and to a radial inner side 52 of the fixed structure 34 and a radial outer side 54 of the fixed structure 34. The structure inner side 52 may partially form the inner aerodynamic flow surface 42. The structure outer side 54 may partially form the outer aerodynamic flow surface 40. The fixed structure 34 extends circumferentially about (e.g., completely around) the axial centerline 26, thereby providing the fixed structure 34 with, for example, a tubular body.

The thrust reverser doors 36 are arranged circumferentially about (e.g., on opposing sides of) the axial centerline 26. The thrust reverser doors 36 are moveably (e.g., pivotally) attached to the fixed structure 34. The thrust reverser doors 36 may thereby move (e.g., pivot) between a stowed, closed position (e.g., see FIGS. 1 and 3) and a deployed, open position (e.g., see FIGS. 2 and 4).

When in the stowed position of FIG. 1 (see also FIG. 3), each of the thrust reverser doors 36 extends axially along the axial centerline 26 between a forward end 56 of the respective thrust reverser door 36 and an aft end 58 of the respective thrust reverser door 36. Each of the thrust reverser doors 36 extends radially between and to a radial inner side 60 of the respective thrust reverser door 36 and a radial outer side 62 of the respective thrust reverser door 36. The door inner side 60 may partially form the inner aerodynamic flow surface 42. The door outer side 62 may partially form the outer aerodynamic flow surface 40. Each of the thrust reverser doors 36 extends circumferentially about (e.g., partially around) the axial centerline 26 providing the respective thrust reverser door 36 with an arcuate (e.g., partially conical) body.

Figure 3:
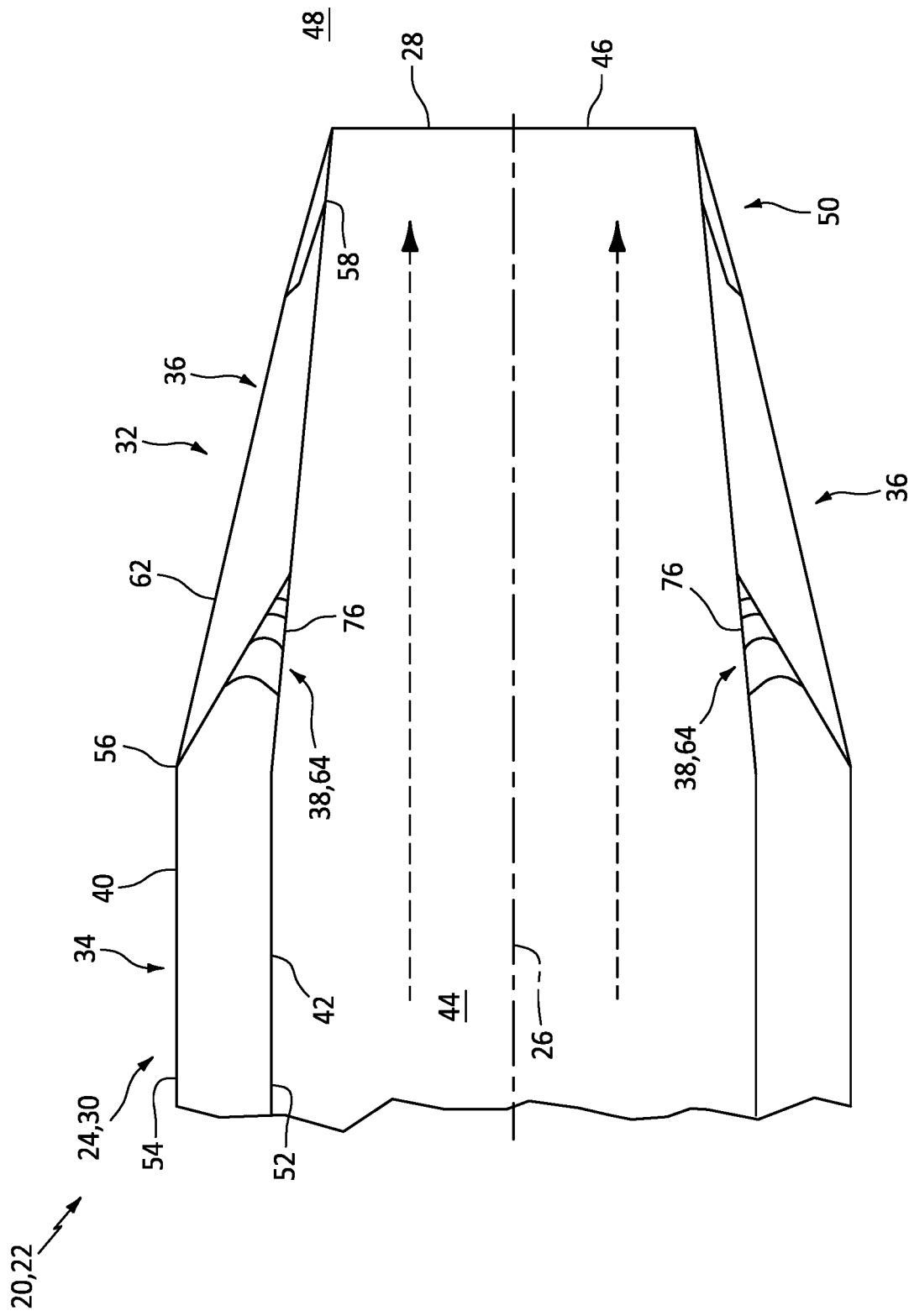
FIG. 3 is a side sectional schematic illustration of an aft section of another aircraft propulsion system with its thrust reverser doors stowed.
Figure 4:
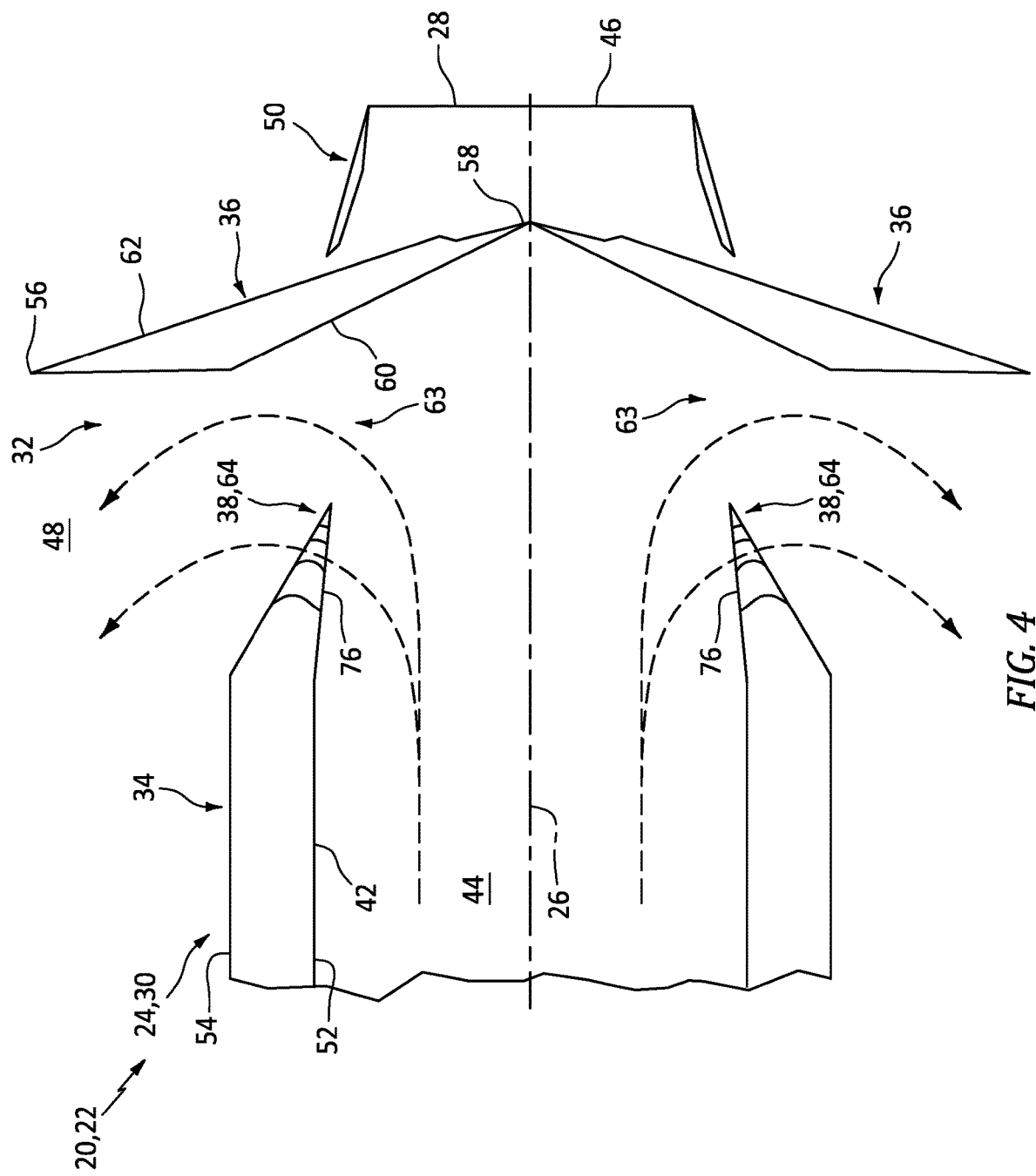
FIG. 4 is a side sectional schematic illustration of the aft section of the aircraft propulsion system of FIG. 3 with its thrust reverser doors deployed.

Each of the stowed thrust reverser doors 36 of FIG. 1 (see also FIG. 3) may axially overlap/cover one or more of the cascade structures 38 and/or an aft portion of the fixed structure 34. By covering the cascade structures 38, the thrust reverser doors 36 may generally prevent gas from flowing radially outward through the cascade structures 38 from the flowpath 44. The gas exhausted from the gas turbine engine may thereby flow (e.g., unobstructed) through the flowpath 44 and out of the aircraft propulsion system 22 through the exhaust nozzle 46. By contrast, when deployed to the deployed position of FIG. 2 (see also FIG. 4), the thrust reverser doors 36 move (e.g., pivot) outward into the exterior environment 48 outside of the aircraft propulsion system 22 and downward into the flowpath 44. This thrust reverser door movement uncovers outer sides of the cascade structures 38 and may open one or more jet pipe openings 63, where each jet pipe opening 63 of FIGS. 2 and 4 is formed and/or extends axially between a respective one of the cascade structures 38 and a respective one of the thrust reverser doors 36. The thrust reverser door movement also positions the thrust reverser doors 36 to substantially or completely block access to the exhaust nozzle 46 as well as redirect the gas flowing within the flowpath 44 radially outward and through the cascade structures 38.

Figure 5:
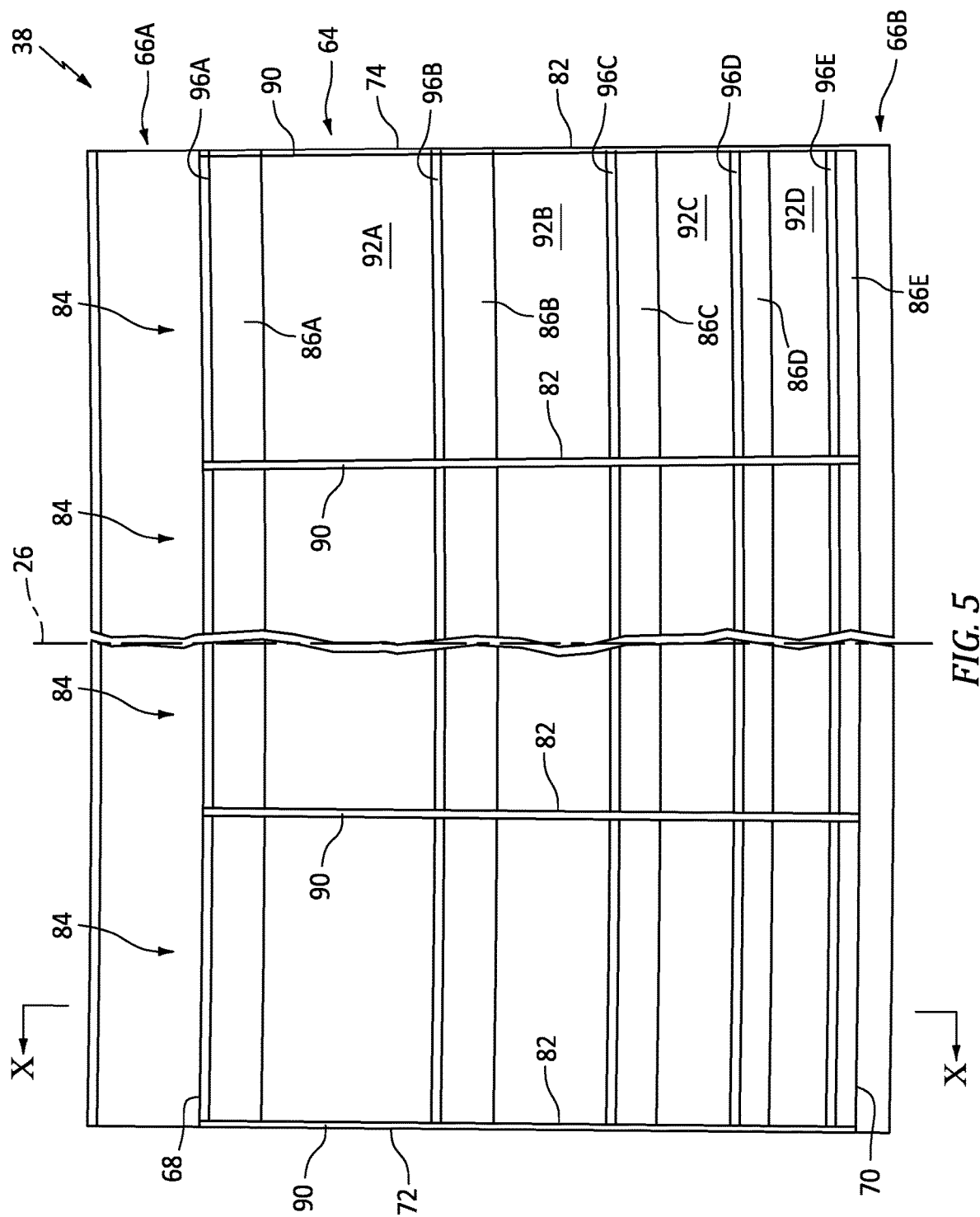
FIG. 5 is a partial illustration of an outer side of a cascade structure.
Figure 6:
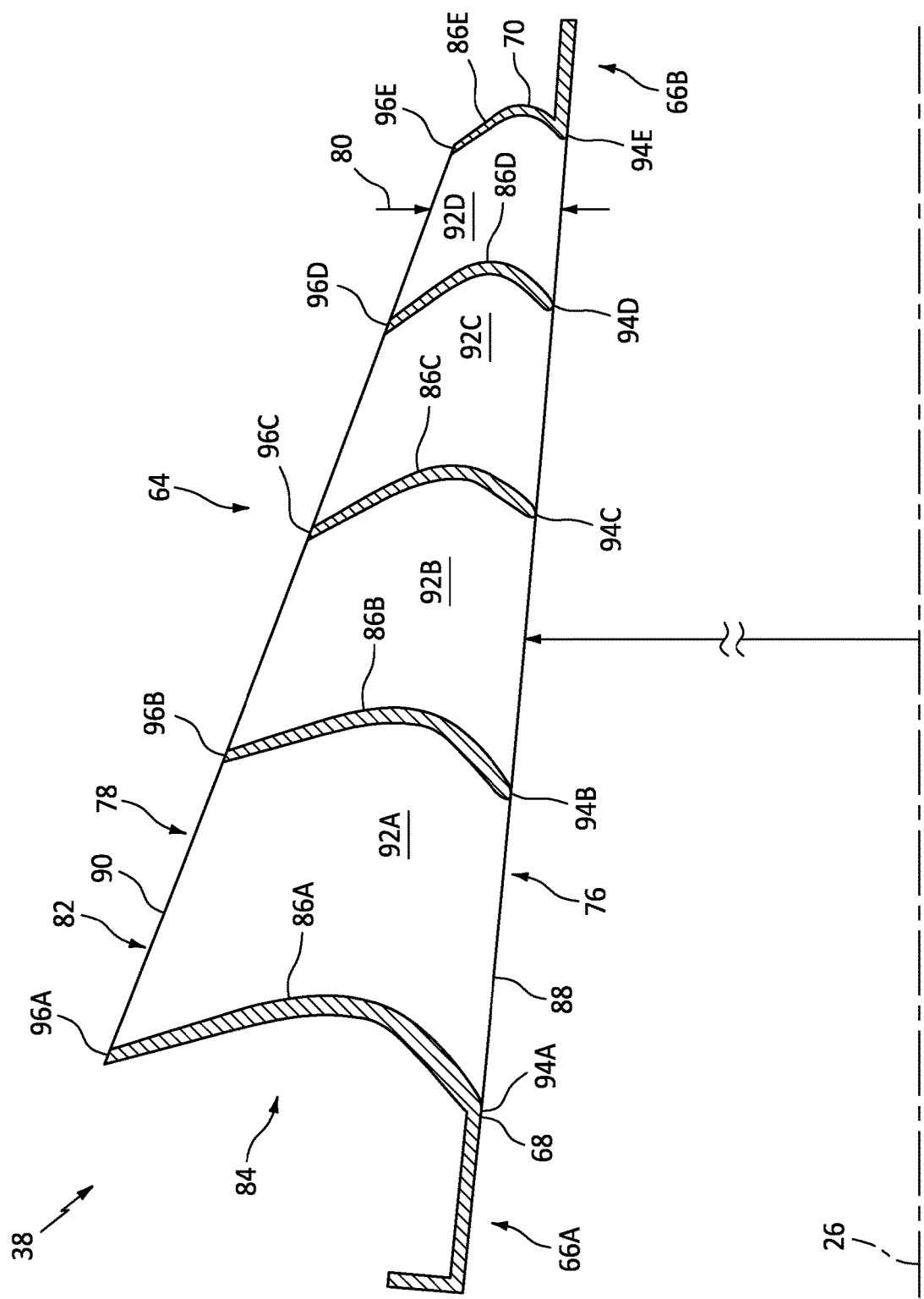
FIG. 6 is a side sectional illustration of the cascade structure of FIG. 5 taken along line X-X, where the cascade structure of FIG. 6 has a first arrangement of cascade vanes.

FIGS. 5 and 6 illustrate an exemplary one of the cascade structures 38. This cascade structure 38 includes a thrust reverser cascade 64 (e.g., a base cascade structure, a cascade basket, etc.) and one or more attachments 66 (e.g., 66A and 66B); e.g., mounting structures.

The thrust reverser cascade 64 of FIG. 5 extends longitudinally (e.g., axially along the axial centerline 26) between and to a forward end 68 of the thrust reverser cascade 64 and an aft end 70 of the thrust reverser cascade 64. The thrust reverser cascade 64 extends laterally (e.g., circumferentially about the axial centerline 26) between and to a first side 72 of the thrust reverser cascade 64 and a second side 74 of the thrust reverser cascade 64. The thrust reverser cascade 64 of FIG. 6 extends radially relative to the axial centerline 26 between and to an inner face 76 of the cascade structure 38 and its thrust reverser cascade 64 and an outer face 78 of the cascade structure 38 and its thrust reverser cascade 64. Referring to FIGS. 1 and 3, each cascade inner face 76 may follow a contour of the inner aerodynamic flow surface 42 and may bridge a gap between the structure inner side 52 and a respective one of the door inner sides 60. Each cascade inner face 76 of FIGS. 1 and 3 is thereby disposed at and extends axially along the flowpath 44 when the thrust reverser doors 36 are stowed. By contrast, referring to FIGS. 2 and 4, each cascade inner face 76 provides an inlet to the respective cascade structure 38 and its thrust reverser cascade 64 when the thrust reverser doors 36 are deployed.

Referring to FIG. 6, at least a portion or an entirety of the cascade inner face 76 may be angularly offset from at least a portion or an entirety of the cascade outer face 78. With such an arrangement, the thrust reverser cascade 64 may radially taper (e.g., a radial distance 80 between the faces 76 and 78 may decrease) as the thrust reverser cascade 64 extends longitudinally between the cascade ends 68 and 70; e.g., from the cascade forward end 68 to the cascade aft end 70. The cascade inner face 76, however, may alternatively be arranged parallel with the cascade outer face 78 such that the radial distance 80 does not change as the thrust reverser cascade 64 extends longitudinally between the cascade ends 68 and 70.

The thrust reverser cascade 64 may be configured such that a (e.g., arcuate) plane of the cascade inner face 76 has a linear (e.g., straight) sectional geometry when viewed, for example, in a first reference plane parallel with the axial centerline 26. The thrust reverser cascade 64 may also be configured such that a (e.g., arcuate) plane of the cascade outer face 78 has a linear (e.g., straight) sectional geometry when viewed, for example, in the first reference plane. The thrust reverser cascade 64, however, may alternatively be configured to provide the plane of the cascade inner face 76 and/or the plane of the cascade outer face 78 with a non-linear (e.g., curved, bent, etc.) sectional geometry when viewed, for example, in the first reference plane.

Figure 7B:
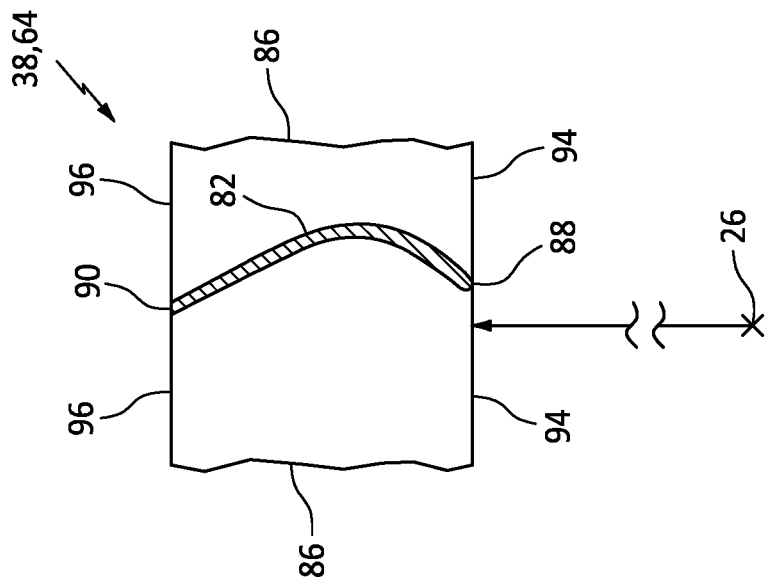
FIGS. 7A and 7B are partial sectional illustrations of a portion of the cascade structure with various arrangements of strongback rail cross-sectional geometries.
Figure 7A:
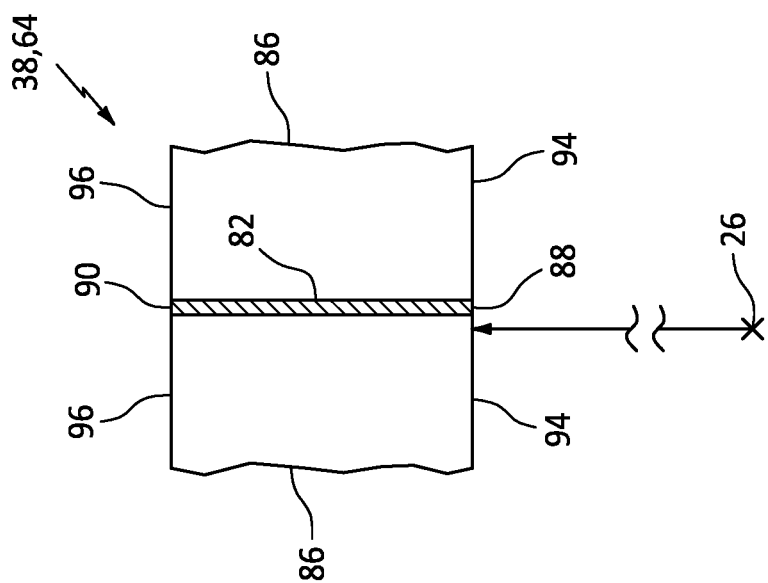

The thrust reverser cascade 64 of FIGS. 5 and 6 includes one or more strongback rails 82 and one or more arrays 84 of cascade vanes 86 (e.g., 86A-E). The strongback rails 82 of FIG. 5 are arranged in parallel with one another. Each of the strongback rails 82 extends longitudinally between and to the cascade forward end 68 and the cascade aft end 70. Each of the strongback rails 82 of FIG. 6 extends radially between and to a leading edge 88 of the respective strongback rail 82 and a trailing edge 90 of the respective strongback rail 82. The rail leading edge 88 may be disposed at (e.g., on, adjacent or proximate), radially aligned with, extend longitudinally along and/or define the plane of the cascade inner face 76. The rail trailing edge 90 may be disposed at, radially aligned with, extend longitudinally along and/or define the plane of the cascade outer face 78. Referring to FIG. 7A, each strongback rail 82 may have a linear (e.g., straight) cross-sectional geometry when viewed, for example, in a second reference plane perpendicular to the axial centerline 26. Alternatively, referring to FIG. 7B, one or more or all of the strongback rails 82 may each have a non-linear (e.g., curved) cross-sectional geometry when viewed, for example, in the second reference plane. With such a configuration, the strongback rails 82 may facilitate directing gas flow through the respective cascade structure 38 in a circumferential direction.

Referring to FIG. 5, each array 84 of the cascade vanes 86 is arranged between a respective laterally neighboring (e.g., adjacent) pair of the strongback rails 82. Each of the cascade vane arrays 84 includes a plurality of the cascade vanes 86. Within each cascade vane array 84, the cascade vanes 86 are disposed at discrete locations along a longitudinal length of the respective strongback rails 82. The forward cascade vane 86A of FIG. 5, for example, is disposed at the cascade forward end 68. This forward cascade vane 86A may form a bullnose and/or a ramp for the cascade vane array 84; see also FIG. 6. The aft cascade vane 86E of FIG. 5 is disposed at the cascade aft end 70. The intermediate cascade vanes 86B, 86C and 86D of FIG. 5 are arranged sequentially longitudinally between the forward cascade vane 86A and the aft cascade vane 86E. With this arrangement, each longitudinally neighboring (e.g., adjacent) pair of the cascade vanes 86 forms a respective channel 92 (e.g., 92A-D) (e.g., gas passage) therebetween.

Each channel 92 of FIG. 5 extends longitudinally within the thrust reverser cascade 64 between and to a respective longitudinally neighboring pair of the cascade vanes 86. Each channel 92 extends laterally within the thrust reverser cascade 64 between and to a respective laterally neighboring pair of the strongback rails 82. Referring to FIG. 6, each channel extends radially through the thrust reverser cascade 64 between an inlet of the respective channel 92 at the cascade inner face 76 and an outlet of the respective channel 92 at the cascade outer face 78.

Referring to FIG. 5, each of the cascade vanes 86 extends laterally between and to the respective laterally neighboring pair of the strongback rails 82. Each of the cascade vanes 86 may be connected to (e.g., formed integral with or bonded to) the respective laterally neighboring pair of the strongback rails 82. Each of the cascade vanes 86 of FIG. 6 extends radially between and to a leading edge 94 (e.g., 94A-E) of the respective cascade vane 86 and a trailing edge 96 (e.g., 96A-E) of the respective cascade vane 86. Radial heights of the cascade vanes 86A-E may vary (e.g., decrease); however, the present disclosure is not limited thereto. The vane leading edge 94 is disposed at (e.g., on, adjacent or proximate) the cascade inner face 76 and, thus, may be radially aligned with (or proximate to) the rail leading edge 88. The vane trailing edge 96 is disposed at (e.g., on, adjacent or proximate) the cascade outer face 78 and, thus, may be radially aligned with (or proximate to) the rail trailing edge 90. Each of the cascade vanes 86 may have a non-linear (e.g., curved) cross-sectional geometry when viewed, for example, in a third reference plane perpendicular to the respective cascade vane 86 and/or parallel with the axial centerline 26. With such a configuration, the cascade vanes 86 may facilitate directing gas flow through the respective cascade structure 38 in an axial direction; e.g., an axially forward direction.

Referring to FIGS. 5 and 6, each of the cascade attachments 66 is configured to attach/mount the respective cascade structure 38 and its thrust reverser cascade 64 to another structure of the aircraft propulsion system 22 such as, but not limited to, a forward torque box and/or an aft support ring. The cascade attachments 66 of FIGS. 5 and 6, for example, are configured as attachment flanges. The forward cascade attachment 66A is disposed at the cascade forward end 68, and is connected (e.g., formed integral with or bonded to) the thrust reverser cascade 64 and its elements 82 and 86A. The forward attachment of FIG. 6 forms a segment of the inner aerodynamic flow surface 42 longitudinally adjacent and upstream of the cascade vane 86A; e.g., the cascade bullnose and/or the cascade ramp. The aft cascade attachment 66B is disposed at the cascade aft end 70, and is connected (e.g., formed integral with or bonded to) the thrust reverser cascade 64 and its elements 82 and 86E. The aft attachment of FIG. 6 forms a segment of the inner aerodynamic flow surface 42 longitudinally adjacent and downstream of the cascade vane 86E.

Figure 8:
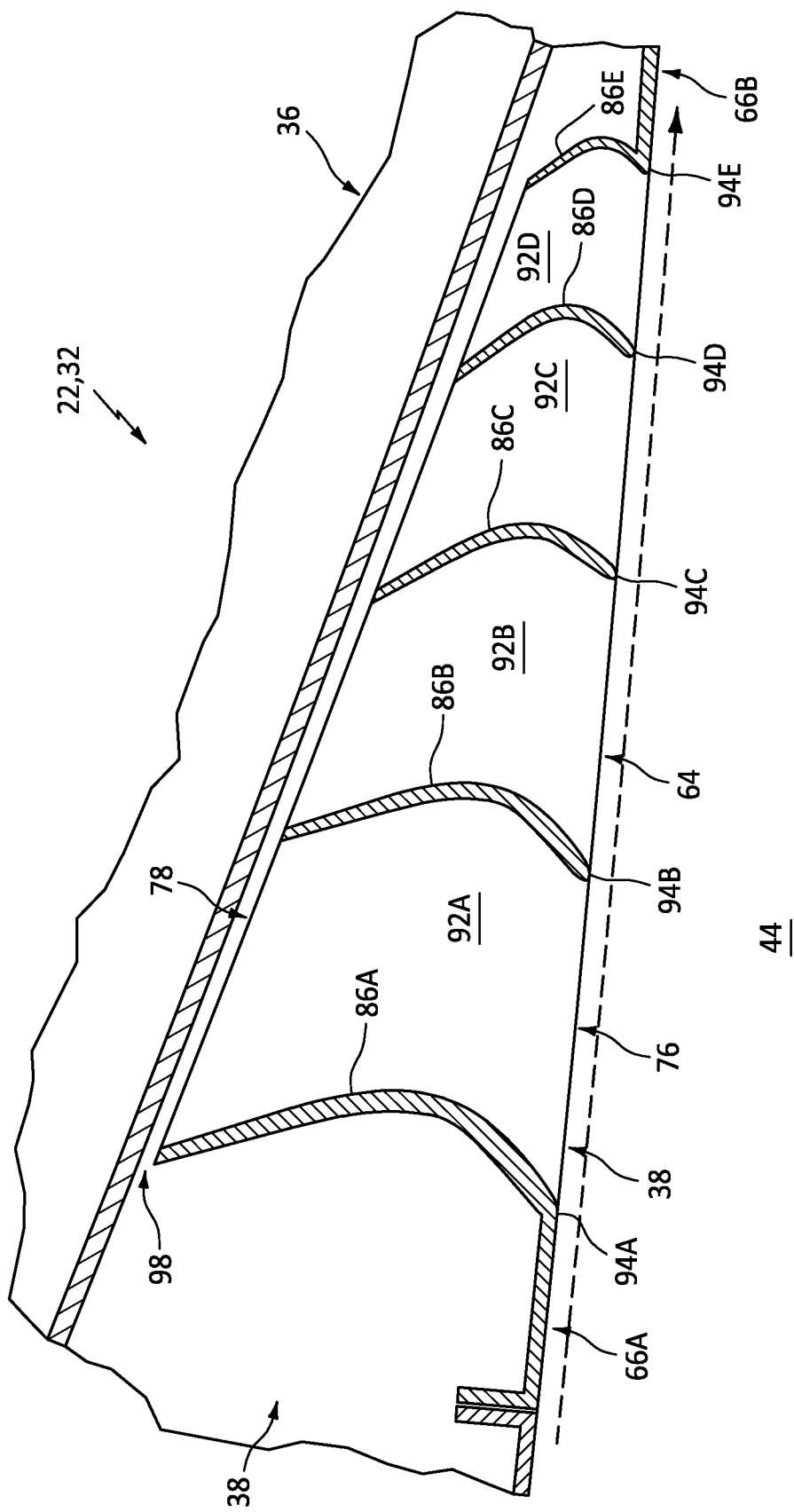
FIG. 8 is a side sectional illustration of a portion of the aircraft propulsion system with the cascade structure of FIG. 6 depicted during forward thrust operation.

Referring to FIG. 8, when the thrust reverser doors 36 are stowed, the gas within the flowpath 44 flows axially along and across each cascade inner face 76 (see also FIGS. 1 and 3). Where each of the vane leading edges 94 is disposed on, radially aligned with, extends laterally along and/or defines the plane of the cascade inner face 76, the gas flow may interact with the respective cascade structure 38 and its cascade vanes 86 and generate an audible sound. For example, the gas flow grazing over the cascade vanes 86 and their vane leading edges 94 may excite an acoustic feedback mechanism from shear layer impingement; e.g., Rossiter modes. This noise may be amplified by volumes (e.g., the channels 92) within the respective cascade structure 38 and/or a closed volume 98 between the respective cascade structure 38 and the overlapping stowed thrust reverser door 36. More particularly, the Rossiter modes may couple with cavity back-volume acoustic modes. This sound may propagate within the aft structure 30 and may increase a noise signature of the aircraft propulsion system 22.

To disrupt, mitigate and/or prevent the sound generated by the flow of gas across the cascade structures 38, one or more or all of the cascade structures 38 may each be configured with one or more flow stabilizers at the respective cascade inner face 76. Exemplary flow stabilizers are shown in FIGS. 9-12.

Figure 13:
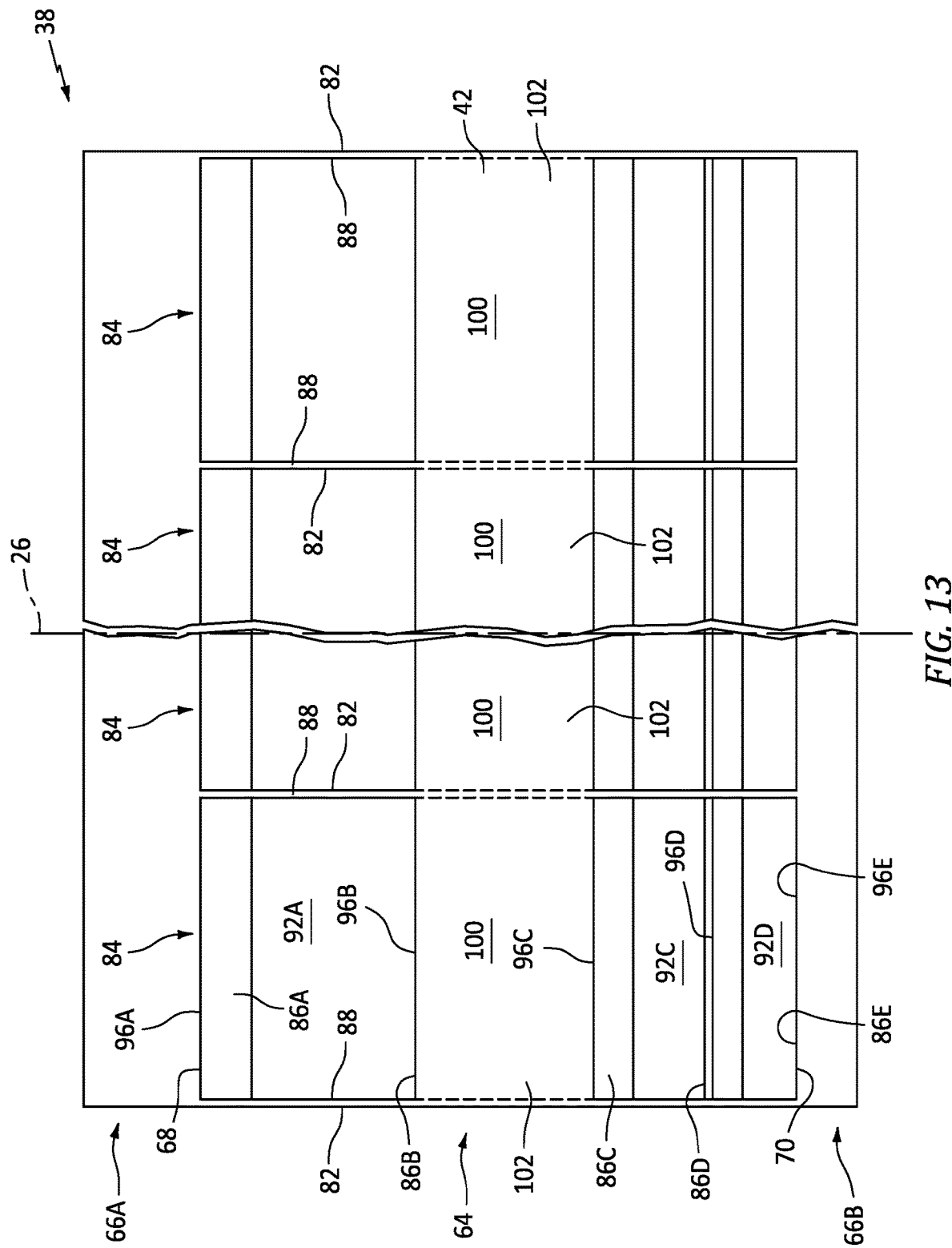
FIG. 13 is a partial illustration of an inner side of the cascade structure with the cascade wall.

Each flow stabilizer of FIGS. 9-12 is configured as or otherwise includes a cascade wall 100. This cascade wall 100 is configured to block gas from flowing out from the flowpath 44 (e.g., see FIG. 1-4) radially through the respective cascade structure 38 between a longitudinally neighboring pair of the cascade vanes 86; e.g., 86B and 86C. Each cascade wall 100 of FIGS. 9-12, for example, forms a longitudinal segment of the inner aerodynamic flow surface 42. This longitudinal segment may extend from the vane leading edge (e.g., 94B) of a first of the respective cascade vanes (e.g., 86B) to the vane leading edge (e.g., 94C) of a second of the respective cascade vanes (e.g., 86C). Referring to FIG. 13, each cascade wall 100 also forms a lateral segment of the inner aerodynamic flow surface 42. This lateral segment may extend from the rail leading edge 88 of a first one of the strongback rails 82 to the rail leading edge 88 of a laterally neighboring second one of the strongback rails 82 (or alternatively, laterally across the entire thrust reverser cascade 64). With the arrangement of FIGS. 9-13, a dominant Rossiter mode may be targeted for the cascade channel (e.g., 92A) upstream of the cascade wall 100 by creating a smooth transition for passive flow control across the cascade inner face 76 between the respective cascade vanes (e.g., 86B and 86C). Attenuating this dominant Rossiter mode may also reduce or prevent excitation of the cavity back-volume acoustic modes.

Figure 9:
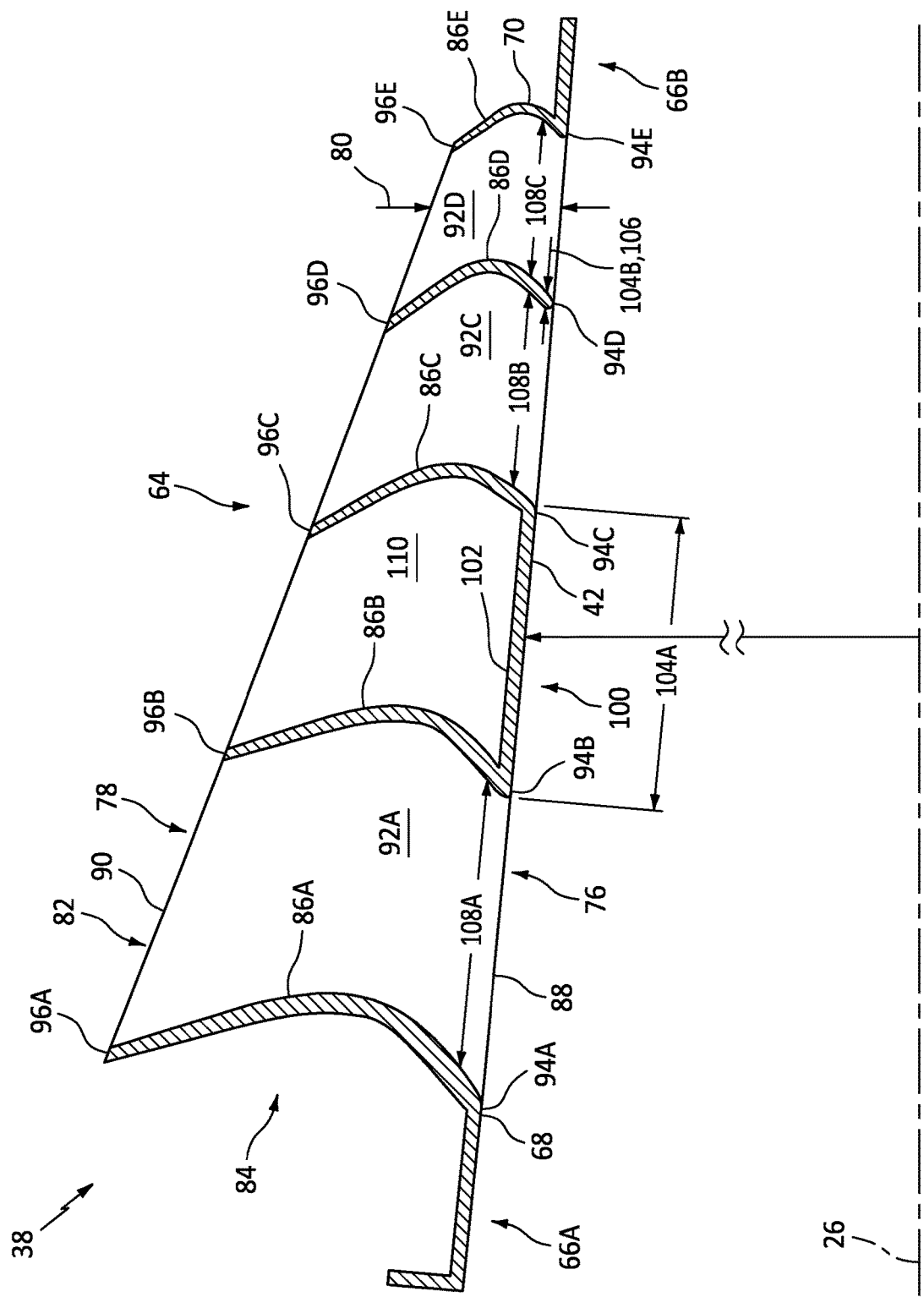
FIGS. 9-12 are side sectional illustrations of the cascade structure with various cascade flow stabilizer arrangements.
Figure 10:
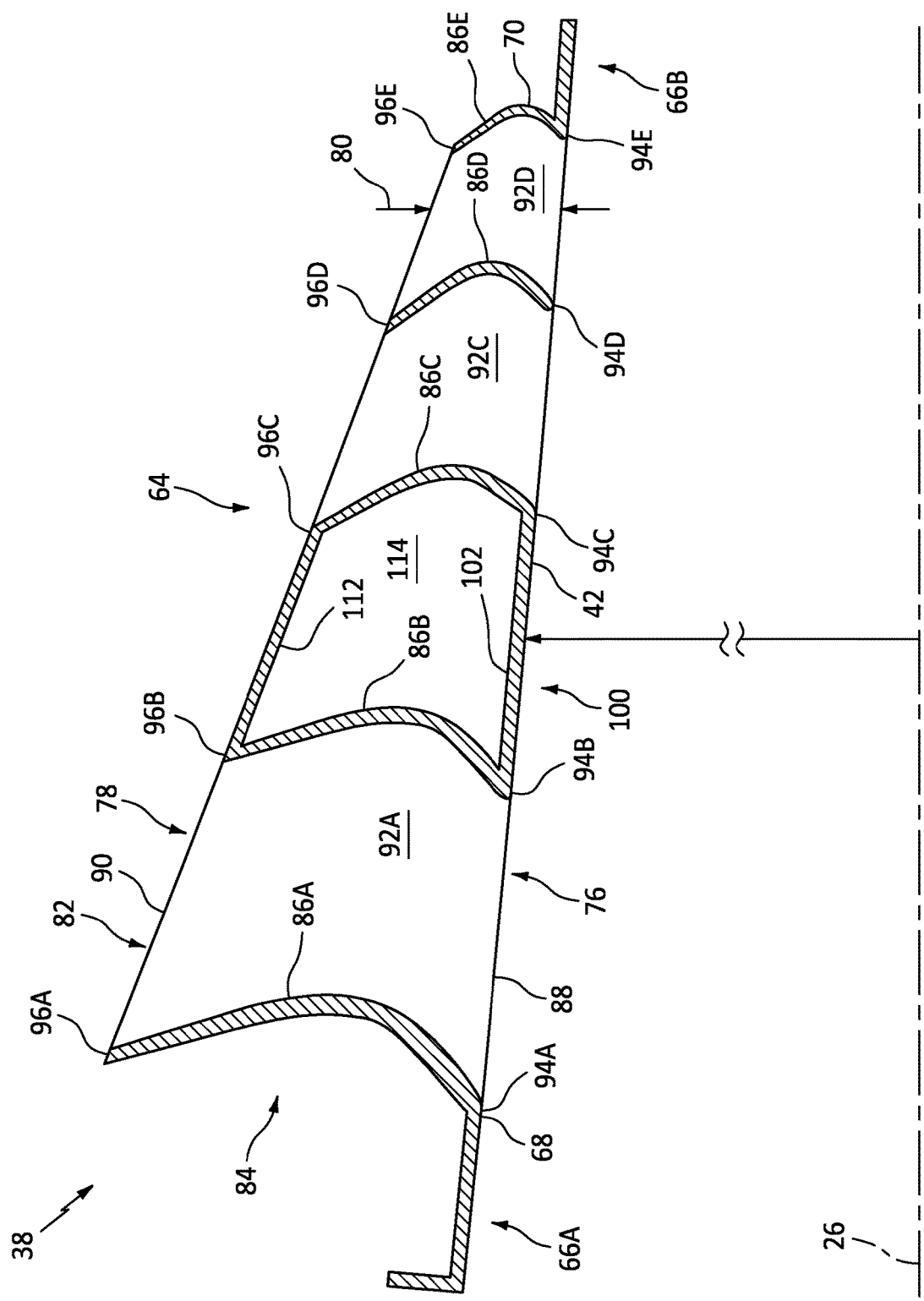
Figure 11:
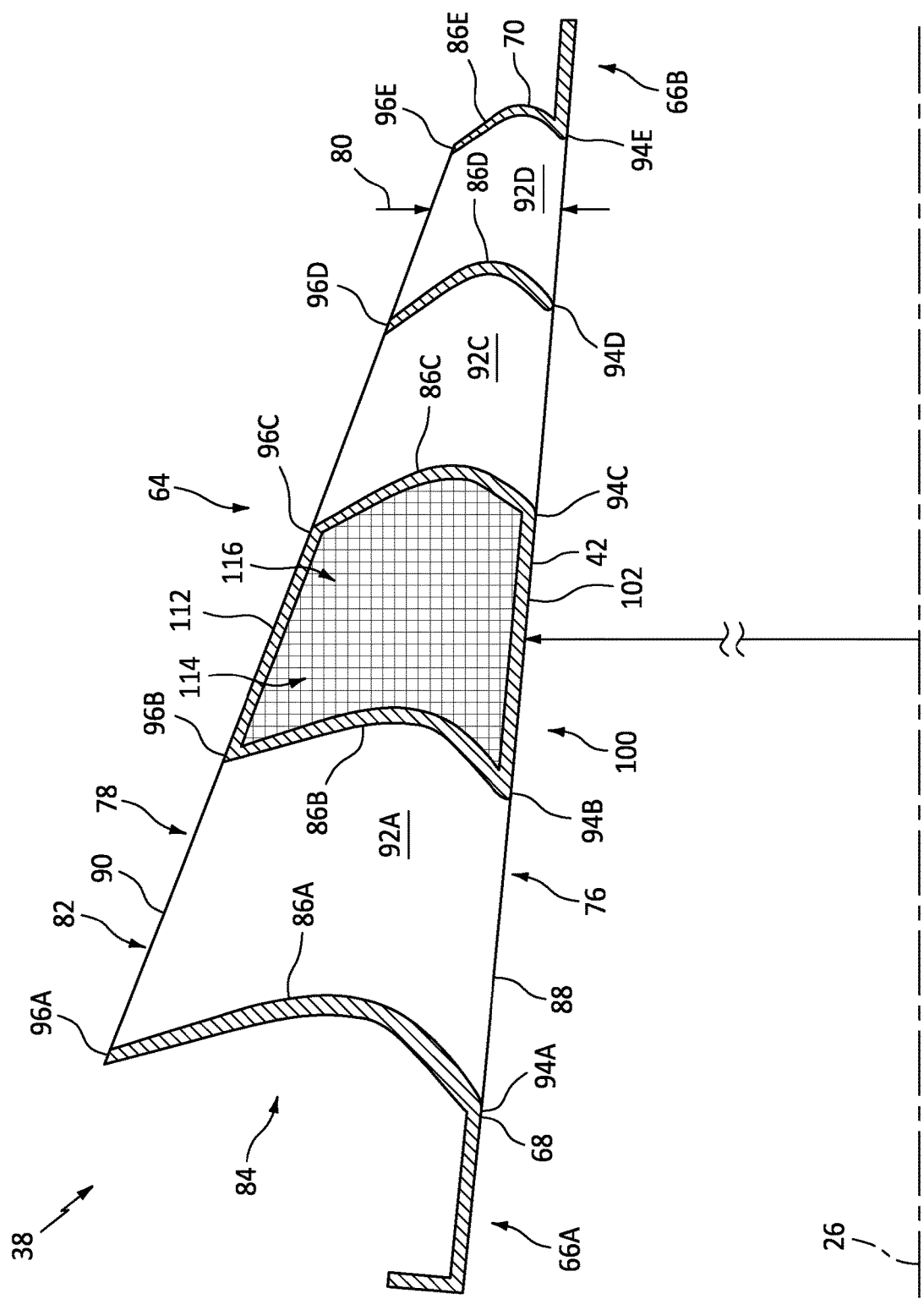
Figure 12:
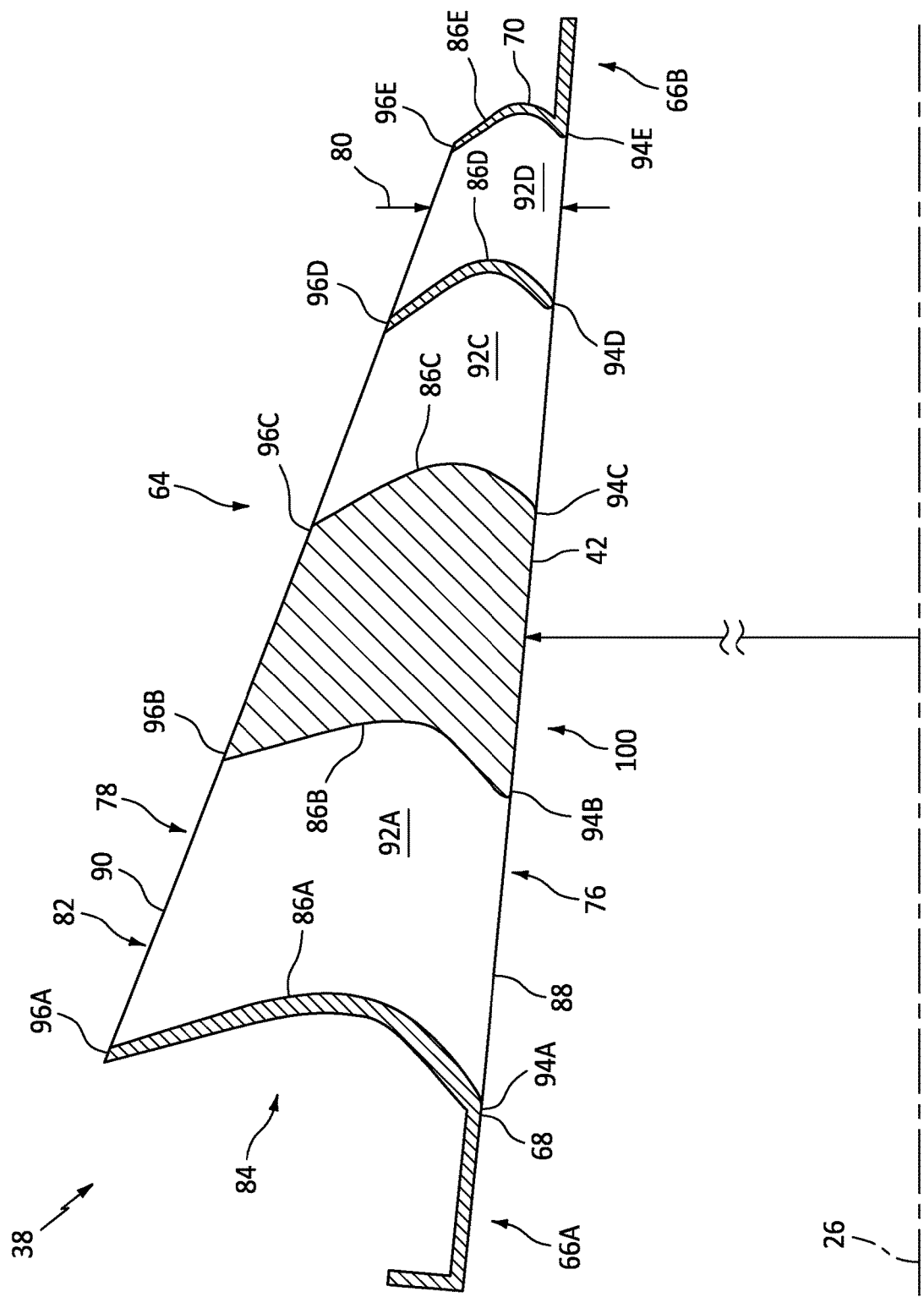

Referring to FIGS. 9-11, each cascade wall 100 may be configured as or otherwise includes an inner wall panel 102. This inner wall panel 102 is arranged at the cascade inner face 76. The inner wall panel 102 extends longitudinally between and is connected to (e.g., formed integral with or bonded to) the cascade vane 86B at its vane leading edge 94B and the cascade vane 86C at its vane leading edge 94C. Referring to FIG. 13, the inner wall panel 102 extends laterally between and is connected to (e.g., formed integral with or bonded to) a first of the strongback rails 82 at its rail leading edge 88 and a second of the strongback rails 82 at its rail leading edge 88 (or alternatively, laterally across the entire thrust reverser cascade 64). Referring again to FIGS. 9-11, the inner wall panel 102 may be configured as a fluid impermeable (e.g., non-perforated and/or non-porous panel) panel; however, the present disclosure is not limited thereto. The inner wall panel 102 partially forms a respective segment of the inner aerodynamic flow surface 42.

Referring to FIG. 9, by configuring the inner wall panel 102 with the cascade vanes 86B and 86C, the cascade wall 100 and its inner wall panel 102 extend/increase a longitudinal distance between longitudinally neighboring cascade channels 92. For example, the cascade channel 92A is longitudinally spaced from the cascade channel 92C by a longitudinal distance 104A which is greater than a longitudinal thickness 106 of any one of the cascade vanes 86. This longitudinal distance 104A therefore is greater than a longitudinal distance 104B between the cascade channel 92C and the cascade channel 92D. The longitudinal distance 104A, for example, may be at least two times (2×), five times (5×), ten times (10×), twenty times (20×) the longitudinal distance 104B and/or the vane thickness 106. Furthermore, the longitudinal distance 104A may be sized less than (or equal to) a longitudinal thickness 108A of the cascade channel 92A and/or sized greater than (or equal to) a longitudinal thickness 108B, 108C of the cascade channel 92C, 92D. The present disclosure, however, is not limited to the foregoing exemplary dimensional relationships.

In some embodiments, referring to FIG. 9, each cascade wall 100 may be associated with a groove 110 in the thrust reverser cascade 64. This groove 110 projects radially into the thrust reverser cascade 64 from the cascade outer face 78 to the respective inner wall panel 102. The groove 110 extends longitudinally within the thrust reverser cascade 64 between and to the cascade vane 86B and the cascade vane 86C. The groove 110 extends laterally within the thrust reverser cascade 64 between and to the laterally neighboring pair of the strongback rails 82.

In some embodiments, referring to FIGS. 10 and 11, each cascade wall 100 may also (or alternatively) include an outer wall panel 112. This outer wall panel 112 is arranged at the cascade outer face 78. The outer wall panel 112 extends longitudinally between and is connected to (e.g., formed integral with or bonded to) the cascade vane 86B at its vane trailing edge 96B and the cascade vane 86C at its vane trailing edge 96C. The outer wall panel 112 extends laterally between and is connected to (e.g., formed integral with or bonded to) the respective laterally neighboring pair of the strongback rails 82 at their rail trailing edges 90. The outer wall panel 112 may be configured as a fluid impermeable (e.g., non-perforated and/or non-porous panel) panel; however, the present disclosure is not limited thereto.

In some embodiments, referring still to FIGS. 10 and 11, each cascade wall 100 may be configured with an internal cavity 114. The internal cavity 114 of FIGS. 10 and 11 extends radially within the thrust reverser cascade 64 between and to the inner wall panel 102 and the outer wall panel 112. The internal cavity 114 extends longitudinally within the thrust reverser cascade 64 between and to the cascade vane 86B and the cascade vane 86C. The internal cavity 114 extends laterally within the thrust reverser cascade 64 between and to the respective laterally neighboring pair of the strongback rails 82. Referring to FIG. 10, the internal cavity 114 may be empty; e.g., filled (e.g., only) with gas. Referring to FIG. 11, the internal cavity 114 may alternatively be partially or completely filled with filler material 116. This filler material 116 may be provided to enhance stiffness of the thrust reverser cascade 64 and/or sound attenuation properties of the thrust reverser cascade 64. Examples of the filler material 116 include, but are not limited to, cellular foam, a micro lattice or a truss structure. In still other embodiments however, referring to FIG. 12, the cascade wall 100 may be solid.

Figure 14:
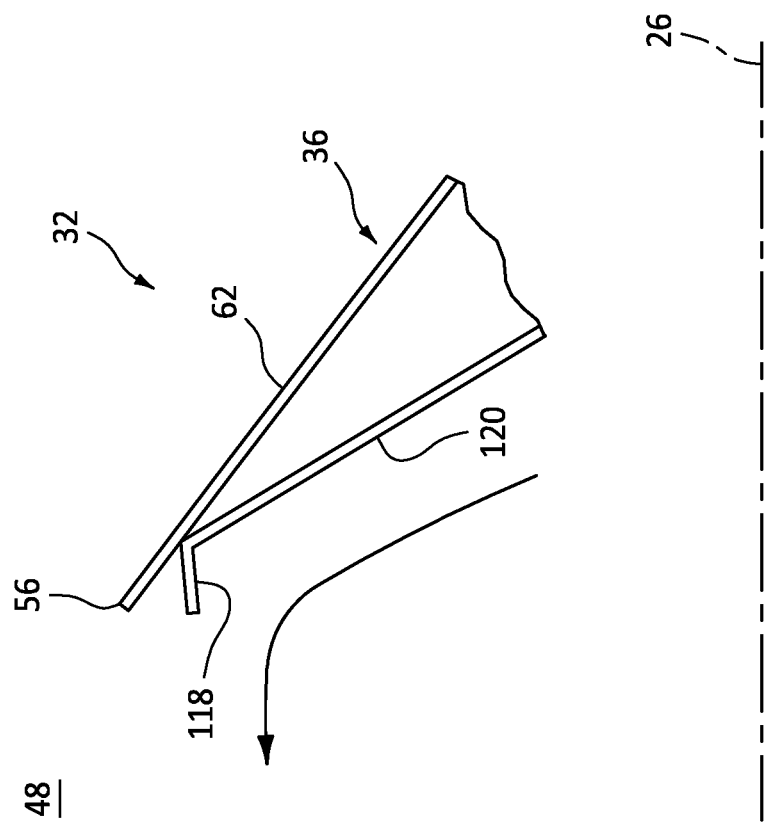
FIG. 14 is a partial sectional illustration of one of the thrust reverser doors with a kicker frame.

In some embodiments, referring to FIG. 14, one or more of the thrust reverser doors 36 may each include a kicker frame 118 at the door forward end 56. This kicker frame 118 may meet a ramp surface 120 of the respective thrust reverser doors 36. The ramp surface 120 directs air passing radially outward through the thrust reverser system 32 when deployed to the kicker frame 118. The kicker frame 118 redirects the air in an axially forward direction.

While various embodiments of the present invention have been disclosed, it will be apparent to those of ordinary skill in the art that many more embodiments and implementations are possible within the scope of the invention. For example, the present invention as described herein includes several aspects and embodiments that include particular features. Although these features may be described individually, it is within the scope of the present invention that some or all of these features may be combined with any one of the aspects and remain within the scope of the invention. Accordingly, the present invention is not to be restricted except in light of the attached claims and their equivalents.

What is claimed is:

1. An apparatus for an aircraft propulsion system, comprising:
   a thrust reverser system including a thrust reverser door and a thrust reverser cascade;
   the thrust reverser door configured to move relative to the thrust reverser cascade between a stowed position and a deployed position;
   the thrust reverser cascade extending longitudinally between a cascade forward end and a cascade aft end, the thrust reverser cascade extending laterally between a cascade first side and a cascade second side, and the thrust reverser cascade extending radially between a cascade inner face and a cascade outer face;
   the thrust reverser cascade including a plurality of vanes and a wall;
   the plurality of vanes arranged in a longitudinally extending array along the cascade inner face, and the plurality of vanes including a first vane and a second vane; and
   the wall configured to block gas flow radially through the thrust reverser cascade between the first vane and the second vane when the thrust reverser door is in the deployed position, and wherein the wall is disposed at the cascade inner face.

2. The apparatus of claim 1, wherein the wall extends longitudinally between and is connected to the first vane and the second vane.

3. The apparatus of claim 1, wherein
   the thrust reverser cascade further includes a plurality of rails extending longitudinally along and connected to the plurality of vanes; and
   the wall extends laterally between and is connected to the plurality of rails.

4. The apparatus of claim 1, wherein
   the wall comprises a first panel;
   the first panel is connected to the first vane at a leading edge of the first vane; and
   the first panel is connected to the second vane at a leading edge of the second vane.

5. The apparatus of claim 4, wherein
   the wall further comprises a second panel;
   the second panel is connected to the first vane at a trailing edge of the first vane; and
   the second panel is connected to the second vane at a trailing edge of the second vane.

6. The apparatus of claim 5, wherein
   a cavity extends longitudinally within the thrust reverser cascade between the first vane and the second vane;
   the cavity extends radially within the thrust reverser cascade between the first panel and the second panel.

7. The apparatus of claim 6, wherein the cavity is empty.

8. The apparatus of claim 6, wherein the cavity is at least partially filled with filler material.

9. The apparatus of claim 4, wherein
   a groove projects radially into the thrust reverser cascade from the cascade outer face to the first panel; and
   the groove extends longitudinally within the thrust reverser cascade between the first vane and the second vane.

10. The apparatus of claim 1, wherein
    the wall extends longitudinally between the first vane and the second vane; and
    the wall extends radially between the cascade inner face and the cascade outer face.

11. The apparatus of claim 1, wherein
    the plurality of vanes further include a third vane; and
    a first channel extends radially through the thrust reverser cascade between the third vane and the first vane.

12. The apparatus of claim 11, wherein the third vane is longitudinally forward of the first vane.

13. The apparatus of claim 11, wherein the third vane is longitudinally aft of the first vane.

14. The apparatus of claim 11, wherein
    the plurality of vanes further include a fourth vane; and
    a second channel extends radially through the thrust reverser cascade between the fourth vane and the second vane.

15. The apparatus of claim 1, wherein the thrust reverser system comprises a pivoting door thrust reverser system.

16. The apparatus of claim 1, further comprising:
    a propulsion system structure including a flowpath and a thrust reverser system;
    the flowpath extending within the propulsion system structure to an exhaust nozzle; and
    the thrust reverser system comprising the thrust reverser cascade, and the plurality of vanes exposed to the flowpath when the thrust reverser system is stowed.

17. An apparatus for an aircraft propulsion system, comprising:

a propulsion system structure including a flowpath and a thrust reverser system;

the flowpath extending within the propulsion system structure to an exhaust nozzle;

the thrust reverser system comprising a thrust reverser cascade;

the thrust reverser cascade extending longitudinally between a cascade forward end and a cascade aft end, the thrust reverser cascade extending laterally between a cascade first side and a cascade second side, and the thrust reverser cascade extending radially between a cascade inner face and a cascade outer face;

the thrust reverser cascade including a plurality of vanes and a wall;

the plurality of vanes distributed longitudinally along the cascade inner face, and the plurality of vanes including a first vane and a second vane longitudinally aft of the first vane; and the wall longitudinally between and connected to the first vane and the second vane; and the plurality of vanes exposed to the flowpath when the thrust reverser system is stowed.

18. The apparatus of claim 17, wherein the thrust reverser cascade further includes a first rail and a second rail;

the plurality of vanes extend laterally between and are connected to the first rail and the second rail; and the wall extends laterally between and is connected to the first rail and the second rail.

19. An apparatus for an aircraft propulsion system, comprising:

a propulsion system structure including a flowpath and a thrust reverser system;

the flowpath extending within the propulsion system structure to an exhaust nozzle;

the thrust reverser system comprising a thrust reverser cascade extending longitudinally between a cascade forward end and a cascade aft end, the thrust reverser cascade extending laterally between a cascade first side and a cascade second side, and the thrust reverser cascade extending radially between a cascade inner face and a cascade outer face;

the thrust reverser cascade including a plurality of channels arranged in a longitudinally extending array, each of the plurality of channels extending radially through the thrust reverser cascade from the cascade inner face to the cascade outer face, and the plurality of channels including a first channel, a second channel and a third channel;

the second channel longitudinally between and neighboring the first channel and the third channel, and a longitudinal distance between the first channel and the second channel different than a longitudinal distance between the second channel and the third channel;

the thrust reverser cascade further including a first vane, a second vane and a wall longitudinally between and connected to the first vane and the second vane, the first vane forming a side of the first channel, the second vane forming a side of the second channel, and the wall arranged at the cascade inner face;

wherein the first vane and the second vane are exposed to the flowpath when the thrust reverser system is stowed.

* * * * *